(No Model.)
A. H. GINDELE.
CONDENSER AND DRIP FOR GAS SERVICE PIPES.
No. 520,675. Patented May 29, 1894.
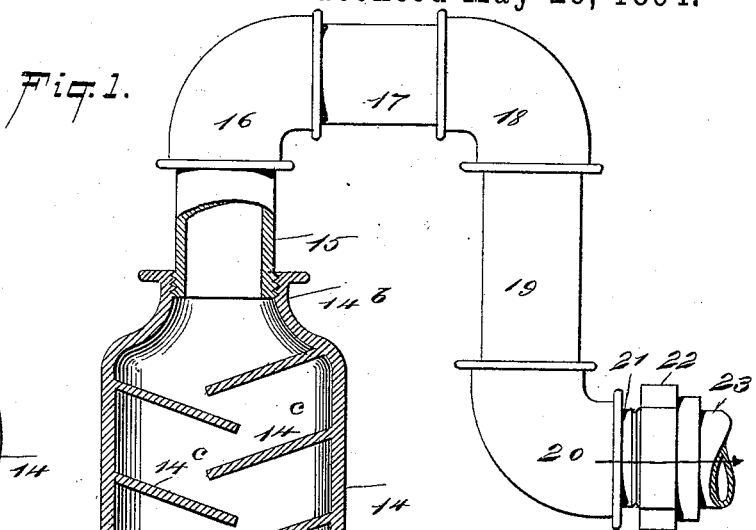
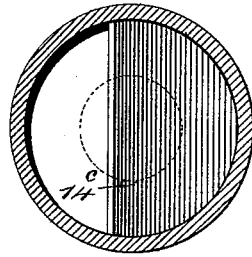
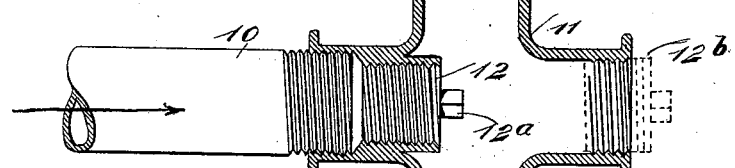
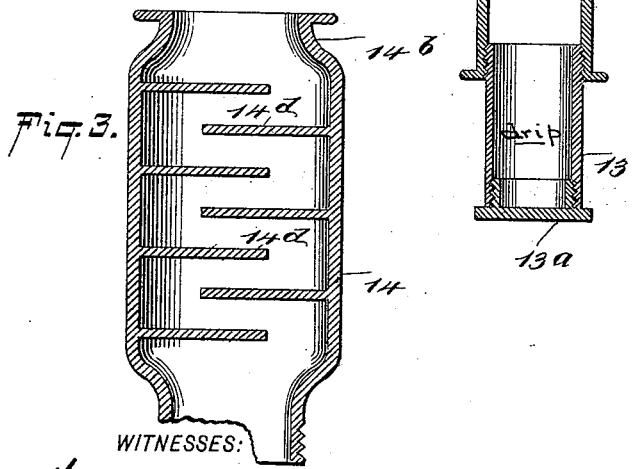
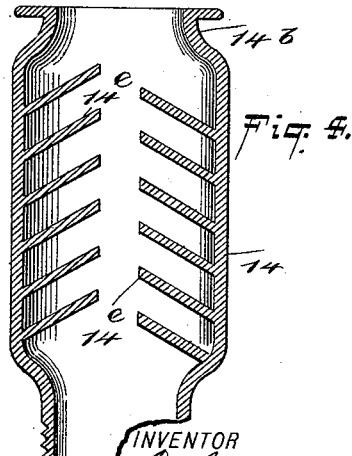
WITNESSES:
William Goebel
C. Sedgwick
INVENTOR
A. H. Gindele
BY
Munn & Co
ATTORNEYS.

UNITED STATES PATENT OFFICE.

ALBERT H. GINDELE, OF JERSEY CITY, NEW JERSEY.

CONDENSER AND DRIP FOR GAS-SERVICE PIPES.

SPECIFICATION forming part of Letters Patent No. 520,675, dated May 29, 1894.

Application filed February 17, 1894. Serial No. 500,489. (No model.)

*To all whom it may concern:*

Be it known that I, ALBERT H. GINDELE, of Jersey City, in the county of Hudson and State of New Jersey, have invented a new and useful Improved Condenser and Drip for Gas-Service Pipes, of which the following is a full, clear, and exact description.

My invention relates to an improved device for arresting the water of condensation that may pervade illuminating gas, and that is carried into house service pipes, the object being to provide a novel, simple and efficient appliance and locate it between the house meter and service pipe, so as to in a large degree remove excess of moisture from the inducted gas and prevent the deposition of condensed water in the meter.

To this end, my invention consists in the construction and combination of parts, as is hereinafter described and claimed.

Reference is to be had to the accompanying drawings, forming a part of this specification, in which similar figures of reference indicate corresponding parts in all the views shown.

Figure 1 is a partly sectional side view of the improvement in position between the inner end of a house service pipe and a meter connection shown in part. Fig. 2 is a sectional plan view of parts, on the line 2—2 in Fig. 1. Fig. 3 is a sectional side view of a modified form for a main feature of the invention; and Fig. 4 is a sectional side view of another modification of the part shown in Fig. 3.

In the drawings, 10 represents the inner end portion of a house service pipe provided to conduct gas from the street main into a building, usually in the basement or cellar. Ordinarily there is a lead pipe connection attached to the inner end of the service pipe such as 10, having a meter stop cock introduced between these parts, the opposite end of the lead pipe connection being secured by a union nut on the inlet post of the meter.

Gas has a tendency to absorb moisture and carry it a considerable distance from the point of distribution, the deposition of this moisture by condensation in gas meters being objectionable, from the fact that it impedes the proper action of a meter, and by water-logging the diaphragm of a dry meter such as is now in common use, the holding capacity of the meter is reduced, so that its value as a measure of quantity is impaired.

To obviate the defects incidental to ordinary methods for the introduction of gas from street mains through house service pipes into gas meters, the present improvement has been provided, comprising features of construction as follows: A four-way fitting 11, of a suitable size is screwed upon the inner threaded end of the service pipe 10, the branch of the fitting that is thus connected being bored and threaded internally in two diameters, the smallest at the inner part of the bore, so that a sealing plug 12, which is slightly tapered and externally threaded, may be screwed into the smaller threaded bore of said branch, as represented in Fig. 1, said plug being introduced through the larger threaded bore of the opposite branch of the four-way fitting, by means of an ordinary socket wrench that is fitted upon the squared projection $12^a$ of the plug, whereby the latter is turned. In the lower vertical branch of the fitting 11, a drip chamber 13 is screwed, its cylindrical body being externally threaded at the upper end, a removable cap $13^a$ being screwed into the lower end of the chamber that is interiorly threaded to receive said cap, as shown in Fig. 1.

An essential feature of the invention consists of the condenser 14. This is preferably given a cylindrical form, having a sufficient length for efficient service, and is contracted in diameter at each end to produce an integral nipple $14^a$ on the lower end, and a neck at the top, said neck $14^b$ being internally threaded, and the nipple threaded externally, the nipple being screwed into the top branch of the fitting 11, as shown in Fig. 1. The condenser chamber 14 is furnished with spaced wings on its inner surface, which may alternate and incline, as shown in Fig. 1 at $14^c$, or be staggered as represented in Fig. 3 at $14^d$, or said wings may be arranged as shown in Fig. 4 at $14^e$, their function being to serve as baffle plates that are adapted to increase the surface of contact for the gas passing through the four-way fitting in an upward direction, it being understood that when the complete device is in place and gas is to be turned on, the plug 12 is to be removed, and a plug $12^b$ that fits the branch opposite the service pipe 10, is to be inserted, so as to seal the outlet in the fitting, said plug being indicated by dotted lines in Fig. 1.

In the neck of the condensing chamber 14, a nipple 15 is screwed, and on it an L-fitting 16, is attached in a like manner. From the other end of the L 16, a nipple 17 projects horizontally of a short length, and on its other end an L 18, similar to 16, is screwed, said L 18 having the nipple 19 inserted so as to depend therefrom, and on its lower end an L 20 is secured, these parts having a threaded engagement with each other. A short nipple 21, is screwed into the remaining end of the L 20, and a union nut 22, which is loosely secured on the end of the meter connection 23, has a threaded engagement with the projecting part of the short nipple 21. The short end portion of the meter connection 23 is intended in use to be extended of a proper length for connection with the inlet part of a dry meter of any approved construction (not shown) the other part of said meter being connected with the gas distributing pipes in the house wherein the meter mentioned is located.

In use, when gas is introduced through the service pipe 10, under pressure from the holder at the gas factory, and passes upwardly toward the meter through the connections that have been described, the larger diameter of the condenser 14 and its numerous wing plates will afford extensive surface for an impinging contact of the inflowing gas, which will, by attrition and the cooling effect of the condenser, remove to a great extent the moisture pervading the gas, which by its condensation thus effected will accumulate in drops of liquid, that by gravity will eventually flow into the drip chamber 13, from which it may be readily removed if the cap 13ª is unscrewed.

It is to be understood that without departing from the spirit of my invention, the L's and nipples above the condensing chamber, as shown in Fig. 1, may be altered as to their tread and arrangement, so as to reach a meter that by its position will not admit of the disposition of parts as illustrated.

Having thus fully described my invention, I claim as new and desire to secure by Letters Patent—

1. The combination with a gas service pipe, and a gas meter pipe, of a condenser having its upper end connected with the meter pipe, and a fitting secured to the lower end of the condenser and provided with a drip chamber, the service pipe being connected with the said fitting, substantially as described.

2. The combination with a gas service pipe and a gas meter pipe, of a condenser having its upper end connected with the meter pipe, a four way fitting secured to the lower end of the condenser, and to which the service pipe is connected, and a drip chamber in the lower vertical branch of the said fitting, substantially as described.

3. The combination with a gas service pipe, and a gas meter pipe, of a condenser provided with spaced baffle plates projecting from opposite sides and having its upper end connected with the meter pipe, and a fitting secured to the service pipe and to the lower end of the condenser and provided with a drip chamber in its lower portion, substantially as described.

4. The combination with a gas service pipe, and a gas meter pipe, of a condenser provided with inclined baffle plates projecting alternately from opposite sides, and having its upper end connected with the condenser, a four way fitting secured to the service pipe and to the lower end of the condenser, and a drip chamber secured to the lower vertical branch of the said fitting, substantially as described.

5. The combination with a gas service pipe, a four-way fitting and a sealing plug for said fitting, of a drip on the lower end of said fitting, a condenser on the upper end of said fitting, a meter pipe, and connections between the meter pipe and condenser, substantially as described.

6. In a gas service condenser and drip, a four-way fitting, one branch of which is threaded in two diameters, the larger diameter receiving the service pipe, and the smaller diameter being engaged by a sealing plug, substantially as described.

7. In a gas service condenser and drip, a four way fitting having its branch, which receives the service pipe threaded in two diameters, a sealing plug fitting in the smaller bore of said branch, and a plug for closing the branch opposite the service pipe, substantially as described.

ALBERT H. GINDELE.

Witnesses:
E. C. CASTA,
GEORGE VAN RIPER.